United States Patent
Reinking et al.

(10) Patent No.: US 6,727,331 B2
(45) Date of Patent: Apr. 27, 2004

(54) PREPARATION OF POLYETHYLENE

(75) Inventors: Mark K. Reinking, Mason, OH (US); Harilaos Mavridis, Cincinnati, OH (US)

(73) Assignee: Equistar Chemicals, LP, Houston, TX (US)

( * ) Notice: Subject to any disclaimer, the term of this patent is extended or adjusted under 35 U.S.C. 154(b) by 67 days.

(21) Appl. No.: 10/041,002

(22) Filed: Dec. 28, 2001

(65) Prior Publication Data
US 2003/0125486 A1 Jul. 3, 2003

(51) Int. Cl.$^7$ .................................................. C08F 4/52
(52) U.S. Cl. ...................... 526/161; 526/172; 526/352; 526/348; 526/131; 526/134
(58) Field of Search ................................ 526/352, 348, 526/134, 131, 161, 172, 905

(56) References Cited

U.S. PATENT DOCUMENTS

| | | | |
|---|---|---|---|
| 5,756,611 A | * | 5/1998 | Etherton et al. ............. 526/127 |
| 5,859,157 A | | 1/1999 | Gupte et al. .................. 526/88 |
| 5,902,866 A | * | 5/1999 | Nagy et al. .................. 526/133 |
| 6,034,192 A | * | 3/2000 | Crowther et al. ........... 526/166 |
| 6,114,457 A | * | 9/2000 | Markel et al. ............... 525/240 |
| 6,127,484 A | | 10/2000 | Cribbs et al. ............... 525/191 |
| 6,211,311 B1 | | 4/2001 | Wang et al. ................. 526/131 |
| 6,221,925 B1 | * | 4/2001 | Constant et al. ............. 521/53 |
| 6,228,958 B1 | * | 5/2001 | Nagy et al. .................. 526/134 |
| 6,294,626 B1 | | 9/2001 | Wang et al. ................. 526/196 |
| 2002/0058766 A1 | * | 5/2002 | Crowther et al. ........... 526/160 |

FOREIGN PATENT DOCUMENTS

WO  WO 93/08221        4/1993
WO  WO 96/34021 A1 * 10/1996  ........... C08F/10/00

OTHER PUBLICATIONS

M. H. Naitove and J. H. Schut, *Plastics Technology,* (Oct. 1993), pp 41–44.
J. M. Dealy and K. F. Wissbrun, *Melt Rheology And Its Role In Plastics Processing,* Van Nostrand Reinhold, New York (1990), pp 60–66.

* cited by examiner

*Primary Examiner*—David W. Wu
*Assistant Examiner*—Rip A. Lee
(74) *Attorney, Agent, or Firm*—Shao-Hua Guo

(57) ABSTRACT

A polyethylene having improved rheological properties is disclosed. The polyethylene has a melt index ($MI_2$) from about 0.01 dg/min to about 50 dg/min and a melt strength ($\eta$) that satisfies $MI_2 \times \eta \geq 3.5$. A process for making the polyethylene is also disclosed. The process uses an azaborolinyl-containing single-site catalyst in the presence of hydrogen, where the hydrogen consumption is controlled to be less than 30%.

8 Claims, No Drawings

PREPARATION OF POLYETHYLENE

FIELD OF THE INVENTION

The invention relates to polyethylene. More particularly, the invention relates to polyethylene that has improved rheological properties and thermal processability.

BACKGROUND OF THE INVENTION

Single-site catalysts often produce olefin polymers having relatively low molecular weight and narrow molecular weight distributions. The uniformity of molecular weight distribution, although improving tensile strength and other physical properties of polymer products, makes the thermal processing more difficult. Olefin polymers having low molecular weights also cause problems in thermal processing because they have low viscosity and low melt strength at low shear rates.

In contrast, polyethylenes made with Ziegler catalysts have relatively high molecular weight and broad molecular weight distribution. They have high melt strength but low melt index. It is desirable to produce a polyethylene having a combination of the properties of single-site polyethylene and Ziegler polyethylene. U.S. Pat. No. 6,127,484, for example, teaches a multiple-zone, multiple-catalyst process for making polyethylene. A single-site catalyst is used in a first reaction zone to produce a polymer having a relatively low molecular weight and a Ziegler catalyst is used in a second zone to make a polymer having a relatively high molecular weight. The two polymers are mixed to give a polymer having a broad molecular weight distribution and improved processability.

It is also known that increasing long-chain branching can improve processability of polyethylene made with single-site catalysts (see WO 93/08221). The existence of long-chain branching in polyethylene is particularly important for blown film extrusion and blow molding processes. However, achieving long-chain branching often requires the use of specific catalysts. For example, WO 93/08221 teaches how to increase the concentration of long-chain branches in polyethylene by using constrained-geometry single-site catalysts.

New polyethylene is needed. Ideally, the polyethylene would have both high melt indexes like single-site polyethylene and high melt strength like Ziegler polyethylene.

SUMMARY OF THE INVENTION

The invention is a polyethylene having improved rheological properties. The polyethylene has a melt index ($MI_2$) from about 0.01 to about 50 dg/min and a melt strength ($\eta$) that satisfies $MI_2 \times \eta \geq 3.5$. The polyethylene can be made by using an azaborolinyl-containing single-site catalyst in the presence of hydrogen, where the hydrogen consumption is controlled to be less than about 30 wt %.

DETAILED DESCRIPTION OF THE INVENTION

The polyethylene of the invention has unique rheological properties. It has a melt index $MI_2$ from about 0.01 dg/min to about 50 dg/min. Preferably, the $MI_2$ is from about 0.05 dg/min to about 10 dg/min. $MI_2$ is measured at 190° C. under 2.16 kilograms of pressure, according to ASTM D-1238.

The polyethylene of the invention has a melt strength $\eta$ that satisfies $MI_2 \times \eta \geq 3.5$. Preferably, $\eta$ satisfies $MI_2 \times \eta \geq 4.0$. More preferably, $\eta$ satisfies $MI_2 \times \eta \geq 5.0$.

Melt strength $\eta$ is the ability of a polymer melt, in an extensional-type deformation, to withstand disturbances that tend to destabilize the process. For example, melt strength in a blown film process usually refers to the bubble stability. Melt strength is commonly characterized by low shear viscosity. See M. H. Naitove and J. H. Schut, *Plastics Technology*, (October 1993) 41–44. Low shear viscosity can be conveniently obtained by dynamic viscoelastic measurements. In this test, an oscillatory shear deformation with a frequency $\omega$ and a strain $\gamma$ is imposed on the polymer melt and the resultant stress response is measured. The ratio of the stress to the strain is the complex modulus, $G^*$, from which the complex viscosity, $\eta^*$, is obtained:

$$\eta^* = G^*/\omega$$

See J. M. Dealy and K. F. Wissbrun, *Melt Rheology and It Role in Plastics Processing*, Van Nostrand Reinhold, New York (1990). Melt strength is defined as:

$$\eta = \eta^* \times 10^{-5}$$

The $\eta$ is measured at 190° C. and at $G^* = 5000$ dyn/cm$^2$.

We have found that the known polyethylenes have a value of $MI_2 \times \eta$ significantly lower than that of polyethylenes of the invention. For instance, Comparative Example 5 shows that a polyethylene made with a borabenzene-based single-site catalyst has $MI_2 \times \eta$ of 3.1. Moreover, Comparative Examples 6–9 show that polyethylenes made with Ziegler catalysts have $MI_2 \times \eta$ values that are even lower.

Preferably, the polyethylene of the invention comprises less than about 15 wt % of $C_3$ to $C_{10}$ α-olefin recurring units. Examples of suitable $C_3$ to $C_{10}$ α-olefins are propylene, 1-butene, 1-pentene, 1-hexene, 1-octene, 4-methyl-1-pentene, and the like, and mixtures thereof. 1-Hexene and 1-butene are preferred. Incorporating long-chain α-olefins reduces the density of polyethylene. The density of the polyethylene is preferably from about 0.89 g/cm$^3$ to about 0.96 g/cm$^3$. More preferably, the density is within the range of about 0.90 g/cm$^3$ to about 0.94 g/cm$^3$. Most preferably, the density is from about 0.90 g/cm$^3$ to about 0.93 g/cm$^3$.

The polyethylene preferably has a weight average molecular weight (Mw) from about 10,000 to about 1,500,000 and a molecular weight distribution (Mw/Mn) less than about 3.5. More preferably, the Mw is from about 30,000 to about 1,000,000. Most preferably, the Mw is from about 30,000 to about 800,000. The Mw/Mn is more preferably less than about 3.0.

The invention includes a process for making the polyethylene. The process uses an azaborolinyl-containing single-site catalyst. Preferably, the single-site catalyst is a Group 3–10 transition metal compound that contains at least one azaborolinyl ligand. Group 4 transition metal compounds are preferred. Azaborolinyl-containing single-site catalysts are known. For instance, U.S. Pat. No. 5,902,866, the teachings of which are incorporated herein by reference, teaches the preparation of azaborolinyl-containing single-site catalysts and the polymerization of an olefin by using the catalysts.

The catalyst contains other ligands. The total number of ligands satisfies the valence of the transition metal. Other suitable ligands include substituted or unsubstituted cyclopentadienyls, indenyls, fluorenyls, halides, $C_1$–$C_{10}$ alkyls, $C_6$–$C_{15}$ aryls, $C_7$–$C_{20}$ aralkyls, dialkylamino, thioether, siloxy, alkoxy, and the like, and mixtures thereof. Halides, cyclopentadienyls, and indenyls are preferred.

Examples of suitable single-site catalysts are (azaborolinyl)(indenyl)titanium dichloride, (azaborolinyl)

(indenyl)zirconium dichloride, (azaborolinyl)(cyclopentadienyl)titanium dichloride, (azaborolinyl)(cyclopentadienyl)zirconium dichloride, and the like, and mixtures thereof. (Azaborolinyl)(cyclopentadienyl)zirconium dichloride is preferred.

Optionally, the catalyst is immobilized on a support. The support is preferably a porous material such as inorganic oxides and chlorides, and organic polymer resins. Preferred inorganic oxides include oxides of Group 2, 3, 4, 5, 13, or 14 elements. Preferred supports include silica, alumina, silica-aluminas, magnesias, titanias, zirconias, magnesium chloride, and crosslinked polystyrene. Silica is most preferred.

Preferably, the support has a surface area in the range of about 10 to about 900 $m^2/g$, a pore volume in the range of about 0.1 to about 4.0 mL/g, an average particle size in the range of about 10 to about 500 μm, and an average pore diameter in the range of about 10 to about 1000 Å. Supports are preferably modified by heat treatment, chemical modification, or both. For heat treatment, the support is preferably heated at a temperature from about 50° C. to about 800° C. More preferably, the temperature is from about 50° C. to about 300° C.

Suitable chemical modifiers include organoaluminum, organosilicon, organomagnesium, and organoboron compounds. Organosilicon and organoboron compounds, such as hexamethyldisilazane and triethylborane, are preferred. Suitable techniques to support a single-site catalyst are taught, for example, in U.S. Pat. No. 6,211,311, the teachings of which are incorporated herein by reference.

The catalyst is used with an activator. Activators can be combined with the catalyst and the optional support or they can be added separately to the polymerization reactor. Suitable activators include anionic compounds of boron and aluminum, trialkylborane and triarylborane compounds, and the like. Examples are lithium tetrakis(pentafluorophenyl) borate, triphenylcarbenium tetrakis(pentafluorophenyl) borate, tris(pentafluorophenyl) borane, methyl alumoxane (MAO), the like and mixtures thereof. Activators are generally used in an amount within the range of about 0.01 to about 100,000, preferably from about 0.1 to about 1,000, and most preferably from about 0.5 to about 300, moles per mole of the single-site catalyst.

The process can be performed in solution, slurry, and gas phase. Gas phase and slurry phase processes are preferred. Methods and apparatus for gas phase polymerization of ethylene with Ziegler catalysts are well known, and they are suitable for use in the process of the invention. For example, U.S. Pat. No. 5,859,157, the teachings of which are herein incorporated by reference, teaches in detail gas phase polymerization of ethylene with a Ziegler catalyst. The slurry phase polymerization is performed in an organic solvent that can disperse the catalyst and polyethylene. Suitable solvents include $C_4$ to $C_{10}$ linear, branched, and cyclic aliphatic, and $C_6$–$C_{12}$ aromatic hydrocarbons. Examples of suitable solvents are butane, hexane, cyclohexane, octane, and isobutane.

The polymerization is preferably conducted under pressure. The pressure is preferably in the range of about 100 to about 15,000 psi, more preferably from about 200 to about 5,000 psi, and most preferably from about 200 to about 2,000 psi. Generally, the higher the pressure, the more productive the process. Laboratory operations are conducted under relatively low pressure for safety reasons.

The process of the invention is performed in the presence of hydrogen. The hydrogen concentration is preferably greater than about 5 moles per mole of the catalyst. The hydrogen consumption rate, i.e., the ratio of the amount of hydrogen consumed over the amount charged, is controlled to be lower than about 30 wt %. We have surprisingly found that when the hydrogen consumption rate is too high, the polyethylene produced does not have the above-discussed characteristics.

The following examples merely illustrate the invention. Those skilled in the art will recognize many variations that are within the spirit of the invention and scope of the claims.

EXAMPLE 1

(1-n-Butyl-2-methyl-$\eta^5$-1,2-azaborolinyl)CpZrCl$_2$ is prepared according to Example 2A of U.S. Pat. No. 5,902,866. The n-butyl derivative of azaboroline is used in the preparation in place of the tert-butyl derivative.

Polymerization is conducted in a 3.8L stainless steel pressure reactor equipped with mechanical agitation, a nitrogen purge device, and a temperature controller. The reactor is heated at 100° C. for an hour, purged with nitrogen three times, and then sealed. Hydrogen is added to the reactor as a 40 psi pressure drop from a 50 $cm^3$ vessel (5.62 mmole). Isobutane (1300 mL) is then added to the reactor. Ethylene is then added to the reactor to 450 psi pressure. Methyl alumoxane (MAO) (10 mL, 30 wt % in toluene) is mixed with the catalyst ($4.44 \times 10^{-7}$ moles in 0.1 mL of toluene). The mixture is flushed into the reactor with isobutane (200 mL). The polymerization is performed for an hour at 75° C. by continuously feeding ethylene to maintain the reactor pressure at 500 psi. A mixture of methanol (5 mL) and isobutane (200 mL) is added into the reactor to terminate the polymerization. The reactor is vented. Polyethylene (24.3 g) is collected. The hydrogen consumption is 17%. The polyethylene has Mn: 25,000, Mw/Mn: 3.2, melt index MI$_2$: 1.25, melt strength η (η is calculated based on η=η*×$10^{-5}$, η* is a complex viscosity measured at 190° C. and at a complex modulus G*=5,000 dyn/$cm^2$): 6.0, and MI$_2$×η:7.5.

EXAMPLE 2

The procedure of Example 1 is repeated, but hydrogen is added to the reactor as an 80 psi pressure drop from a 50 $cm^3$ vessel (11.2 mmole). The hydrogen consumption is 12%. The polyethylene has Mn: 13,700, Mw/Mn: 3.6, melt index MI$_2$: 2.83, melt strength η: 2.0, and MI$_2$×η:5.7.

EXAMPLE 3

The procedure of Example 1 is repeated, but hydrogen is added to the reactor as a 20 psi pressure drop from a 50 $cm^3$ vessel (2.81 mmole). The hydrogen consumption is 17%. The polyethylene has Mn: 38,900, Mw/Mn: 3.0, melt index MI$_2$: 0.07, melt strength η: 740, and MI$_2$×η:51.8.

EXAMPLE 4

The procedure of Example 1 is repeated, but hydrogen is added to the reactor as a 100 psi pressure drop from a 50 $cm^3$ vessel (14 mmole). The hydrogen consumption is 11%. The polyethylene has Mn: 14,300, Mw/Mn: 3.0, melt index MI$_2$: 5.99, melt strength η: 1.86, and MI$_2$×η:11.1.

COMPARATIVE EXAMPLE 5

The procedure of Example 1 is repeated, but a supported (methyl borabenzene)CpZrCl$_2$ is used. The supported catalyst is prepared according to Comparative Example 2 of U.S. Pat. No. 6,294,626. The hydrogen consumption is 100%. The polyethylene has Mn: 16,100, Mw/Mn: 7.6, melt index MI$_2$: 0.44, melt strength η: 7.0, and MI$_2$×η:3.1.

COMPARATIVE EXAMPLES 6–9

M6210, 6220, 6230, and 6260 are commercial polyethylene products from Equistar Chemicals made with Ziegler catalysts. The properties of these polyethylene samples are listed in Table 1. The $MI_2 \times \eta$ values of these samples are all well below 3.5.

TABLE 1

Polyethylene Properties

| Ex. No. | Mn | Mw/Mn | $MI_2$ | $\eta$ | $MI_2 \times \eta$ |
|---|---|---|---|---|---|
| 1 | 25,000 | 3.2 | 1.25 | 6.0 | 7.5 |
| 2 | 13,000 | 3.6 | 2.83 | 2.0 | 5.7 |
| 3 | 38,900 | 3.0 | 0.07 | 740 | 51.8 |
| 4 | 14,300 | 3.0 | 5.99 | 1.86 | 11.1 |
| C5 | 16,100 | 7.6 | 0.44 | 7.0 | 3.1 |
| C6 | — | — | 1.0 | 2.0 | 2.0 |
| C7 | — | — | 2.0 | 0.7 | 1.4 |
| C8 | — | — | 3.0 | 0.46 | 1.4 |
| C9 | — | — | 6.0 | 0.15 | 0.9 |

We claim:

1. A process of making a polyethylene composition, comprising polymerizing an olefin mixture containing ethylene and up to about 15 wt % of a $C_3$ to $C_{10}$ α-olefin in the presence of an azaborolinyl-containing single-site catalyst, an activator, and hydrogen; wherein the hydrogen consumption during a the polymerization is controlled to be less than 30 wt % based on the total amount of hydrogen charged into a polymerization; and wherein the polyethylene composition produced has a melt index ($MI_2$) from about 0.01 to about 50 dg/min, a density from about 0.90 to 0.93 g/cm$^3$, and a melt strength ($\eta$) that satisfies $MI_2 \times \eta \geq 3.5$, wherein $\eta = \eta^* \times 10^{-5}$ and $\eta^*$ is a complex viscosity measured at 190° C. and at a complex modulus $G^* = 5{,}000$ dyn/cm$^2$.

2. The process of claim 1, wherein the azaborolinyl-containing single-site catalyst is a Group 3–10 transition metal compound that contains at least one azaborolinyl ligand.

3. The process of claim 1, wherein the azaborolinyl-containing single-site catalyst is (azaborolinyl)(cyclopentadienyl)zirconium dichloride.

4. The process of claim 1 wherein the activator is selected from the group consisting of alkyl alumoxanes, trialkyl amines, alkyl aluminums, alkyl aluminum halides, anionic compounds boron or aluminum, trialkyl boron compounds, triaryl boron compounds, and mixtures thereof.

5. The process of claim 1 wherein the polyethylene composition satisfies $MI_2 \eta \times \eta \geq 4.0$.

6. The process of claim 1 wherein the polyethylene composition satisfies $MI_2 \times \eta \geq 5.0$.

7. The process of claim 1 wherein the $C_3$ to $C_{10}$ α-olefin is selected from the group consisting of propylene, 1-butene, 1-pentene, 1-hexene, 1-octene, 4-methyl-1-pentene, and mixtures thereof.

8. The process of claim 1 wherein the polyethylene composition has an $MI_2$ within the range of about 0.05 dg/min to about 10 dg/min.

* * * * *